March 15, 1932. E. GRUENFELDT 1,849,520
SHOCK ABSORBER
Filed Sept. 14, 1929
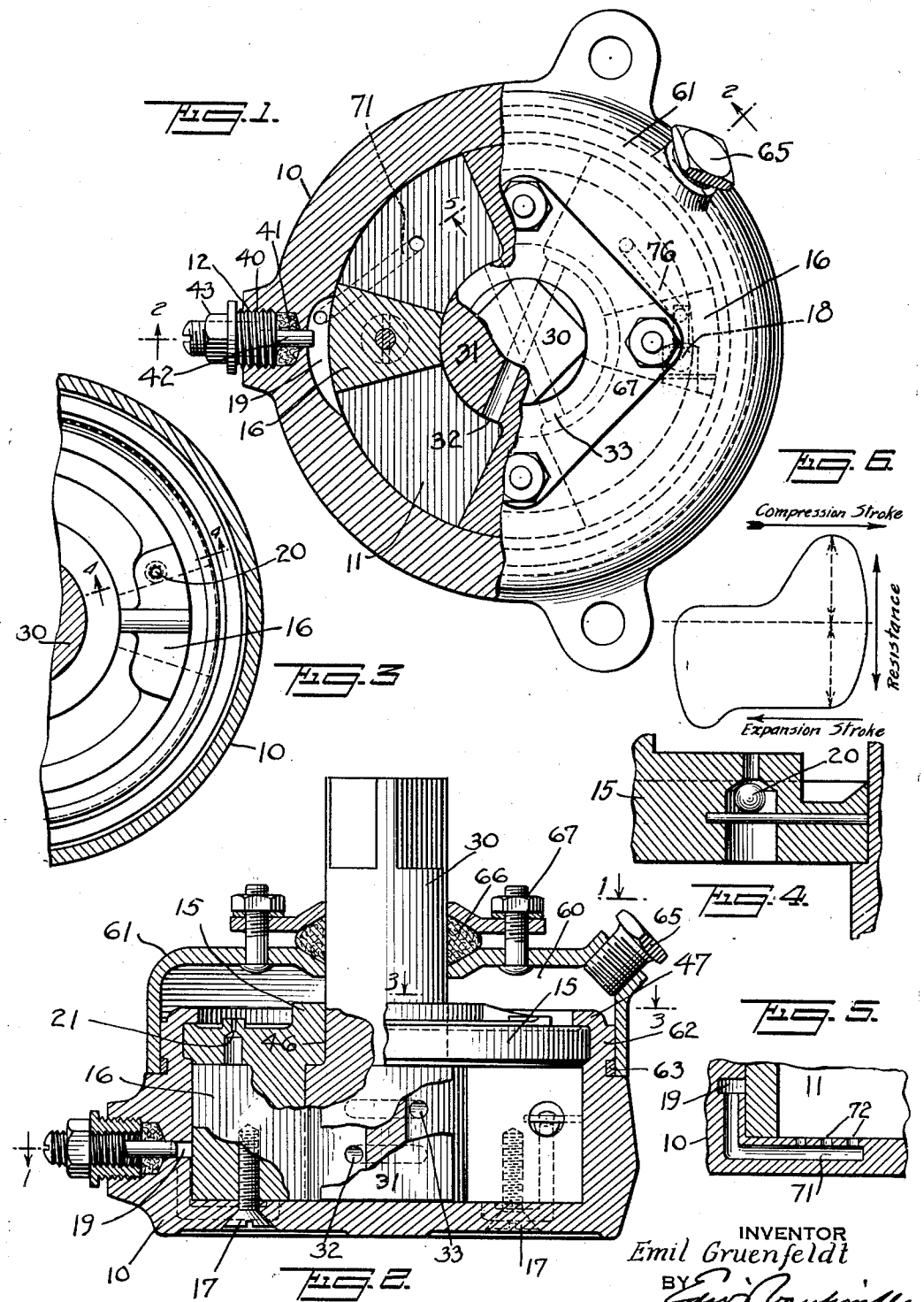
INVENTOR
Emil Gruenfeldt
BY
ATTORNEY Patented Mar. 15, 1932

1,849,520

UNITED STATES PATENT OFFICE

EMIL GRUENFELDT, OF CLEVELAND, OHIO

SHOCK ABSORBER

Application filed September 14, 1929. Serial No. 392,569.

The present invention relates to improvements in liquid shock absorbers for vehicles or other uses and more particularly to the multiple wing rotary or oscillating type in which a liquid confined within the casing is utilized as a cushion to overcome the jouncing of the vehicle and has for its object to provide means for establishing pressure equilibrium in the corresponding pressure chambers by only one fixed or variable bypass for one of each pair of corresponding chambers.

The object of the present improvement is to produce a shock absorber that has increasing braking action toward the end of the impact stroke.

In a former application #367,553 filed by me on May 31, 1929, this feature is only partially taken care of. In that structure when the cross passages in the piston are blocked by the stationary wing two adjacent chambers have increased pressure and the other two are still subject to pressure equalization through the ball check valve in one direction of rotation and through the adjustable valve in the other direction.

In the present structure the passage through the ball check is blocked when the corresponding hole is covered by the moving wing. At this point the device has a pressure governed only by the small amount of bleeding by the high pressure adjustment. A similar action is accomplished before the end of the expansion stroke, as the high pressure adjustable bypass outlet is covered by the moving wing and at this point the device has its maximum pressure.

The foregoing and other features of my invention will now be described in connection with the accompanying drawings forming part of this specification in which I have represented my shock absorber in its preferred form after which I shall point more particularly in the claims those features which I believe to be new and of my own invention.

In the drawings:

Figure 1 is a plan view partly in section.

Figure 2 is a sectional elevation along the line 2—2, Figure 1.

Figure 3 is a mutilated view in part section of the top of the shock absorber with the replenishing chamber removed. (Line 3—3, Figure 2.)

Figure 4 is a detail of ball check employed, line 4—4, Figure 3.

Figure 5 is a section through external channel, line 5 Figure 1 showing a modification which I may employ.

Figure 6 is a diagrammatic pressure area curve which may be expected with the construction shown.

In the drawing I provide a casing 10 having a cylindrical chamber 11 therein. On one side of this casing I provide a valve adjustment 12. Adapted to closely fit into this chamber is a cover member 15 provided with two integral radial partitions 16. The member 15 is provided with a central bearing 46 in which the shaft of a two winged piston 30 is adapted to oscillate. The member 15 may be securely held in position within the casing by any well known means and said holding be assisted by counter sunk screws 17 as illustrated, or a spun top 47.

One of the radial partitions 16 is provided with a valve 18; the opposite radial partition 16 is set in front of a notch 19 within the wall of the casing 10. When the member 15 is secured in place within the casing 10 the notch 19 must fall in front of the wing 16. A valve 12 with usual adjustment controls the opening provided by the slot 19. For the purpose of this disclosure this valve comprises a packing nut 40 adapted to compress the packing 41 tight around the valve stem 42. The valve stem 42 is adjustable and is held by means of nut 43 so that the opening in the notch 19 can be regulated. The member 15 which serves as a top to close the pressure chambers is provided with a check valve 20 and diagonally opposite I provide an air vent 21.

In the hub 31 of the two winged oscillating pistons I provide equalizing passages 32 and 33. Passage 32 interconnects the low pressure chambers, while passage 33 interconnects the high pressure chambers.

A passage 71 external to the cylindrical chamber connects the interior of the chamber with the notch 19 in the side wall thereof. A passage 76 external to the cylindrical chamber connects the interior of the chamber to the ball check 18 in the stationary wing.

In Figure 5 I show a modification in which I may employ a series of small holes 72 spaced circumferentially in the bottom of the chamber connecting the channel 71. With this construction the area of the interconnecting channel is gradually cut off by the holes 72 one after another in its stroke thus gradually closing the passage 71.

A similar external passage 76 is placed to connect the ball check 18 with the chamber. It will be readily understood that the location of these passages may be any place so long as they are external to the cylindrical chamber and may be varied to give a different pressure diagram.

The fluid, instead of passing from one chamber to the adjacent chamber directly through the valve as in my previous mentioned application, the passage is indirect from one chamber through the vertical channel into a horizontal channel and through another vertical channel and the valve into the adjacent chamber. In the present construction the cross bores 32 and 33 are not used for control purposes other than to establish pressure equilibrium in corresponding chambers.

My shock absorber is provided with the usual replenishing chamber 60 and for convenience I illustrate it as a cap or cover 61 adapted to be press fitted on a flange 62 of the casing 10, said joint may be sealed by any well known means such as a cork washer 63. The cover 61 is provided with a filling opening 65 and a central packing 66 with conventional means 67 for securing a tight fit on the shaft 30. It will be noted that the packing is outside of the replenishing chamber and spaced apart and away from the bearing 46.

The characteristic of this shock absorber is best illustrated by resistance curve illustrated in Figure 6. On the compression stroke the liquid flows through passage 76 and the ball check 18 and the passage 71 and the regulated slot 19. The resistance of the shock absorber is defined by the flow of the liquid through these orifices and the velocity of the moving piston. On the expansion stroke the ball check 18 seats and the braking action of the shock absorber against the rebound of the spring is dependent upon the amount of opening in slot 19.

I wish it distinctly understood that my shock absorber herein illustrated and described is in the form in which I desire to construct it but that changes or variations may be made as may be convenient or desirable without departing from the salient features of my invention and I therefore intend the following claims to cover such modifications as naturally fall within the lines of invention.

I claim:

1. A shock absorber comprising a casing having a closed chamber containing liquid; an oscillating piston therein provided with radial blades acting upon said liquid; radial partitions in the chamber, one partition containing a passage blocked by a check valve and connected by external passage to the chamber, a passage from one side of the other partition to the opposite side thereof and a valve for regulating such passage and connected by external passage to the chamber, equalizing passages extending through the piston, each passage connecting only opposite chambers.

2. A shock absorber comprising a cylindrical casing containing liquid and having a radial partition in the same provided with a check valve and an external passage between adjacent chambers and a single external passage also connecting adjacent chambers, an oscillating piston within the casing provided with radial blades and equalizing passages connecting corresponding chambers.

3. A shock absorber comprising a casing having a closed chamber containing liquid; an oscillating piston in said chamber provided with radial blades acting upon said liquid; radial partitions in said chamber dividing the same into a plurality of smaller chambers; one partition having a passage therein blocked by a check valve, said check valve passage connecting two adjacent smaller chambers thru a passage arranged externally of such chambers; there also being a passage arranged externally of the closed chamber and connecting two adjacent chambers; and equalizing passages connecting only corresponding chambers.

4. A shock absorber comprising a casing having a closed chamber containing liquid; an oscillating piston in said chamber provided with radial blades acting upon said liquid; radial partitions in said chamber dividing the same into a plurality of smaller chambers; one partition having a passage therein blocked by a check valve, said check valve passage connecting two adjacent smaller chambers through a passage arranged externally of such chambers; there also being a passage arranged externally of the closed chamber and connecting two adjacent chambers, the capacity of said passage being variable by means of an adjustable valve; and equalizing passages connecting only corresponding chambers.

In witness whereof I affix my signature.

EMIL GRUENFELDT.